(12) United States Patent
Chen et al.

(10) Patent No.: US 12,345,970 B2
(45) Date of Patent: Jul. 1, 2025

(54) ELECTRICALLY CONTROLLED PANEL AND DISPLAY APPARATUS

(71) Applicant: Coretronic Corporation, Hsin-Chu (TW)

(72) Inventors: Ping-Yen Chen, Hsin-Chu (TW); Hsin Huang, Hsin-Chu (TW); Chung-Yang Fang, Hsin-Chu (TW); Ying-Hsiang Chen, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 18/829,182

(22) Filed: Sep. 9, 2024

(65) Prior Publication Data

US 2025/0102843 A1    Mar. 27, 2025

(30) Foreign Application Priority Data

Sep. 22, 2023    (CN) .......................... 202322577976.2

(51) Int. Cl.
| | | |
|---|---|---|
| *G02F 1/13* | (2006.01) | |
| *G02F 1/1335* | (2006.01) | |
| *G02F 1/13363* | (2006.01) | |
| *G02F 1/1337* | (2006.01) | |

(52) U.S. Cl.
CPC ...... *G02F 1/1323* (2013.01); *G02F 1/133531* (2021.01); *G02F 1/133634* (2013.01); *G02F 1/133638* (2021.01); *G02F 1/1337* (2013.01)

(58) Field of Classification Search
CPC ............ G02F 1/1323; G02F 1/133531; G02F 1/133634; G02F 1/133638; G02F 1/1337; G02F 1/13363; G02F 1/13471
See application file for complete search history.

(56) References Cited

U.S. PATENT DOCUMENTS

| | | |
|---|---|---|
| 10,921,622 B2 | 2/2021 | Chen et al. |
| 2021/0048696 A1* | 2/2021 | Fang ................. G02F 1/133502 |
| 2021/0333580 A1 | 10/2021 | Matsushima |

FOREIGN PATENT DOCUMENTS

CN    219065932    5/2023

* cited by examiner

*Primary Examiner* — Kevin Quarterman
(74) *Attorney, Agent, or Firm* — JCIPRNET

(57) ABSTRACT

An electrically controlled panel including a first electrically controlled device including first and second alignment layers and a first liquid-crystal layer disposed therebetween, a first polarizing layer, and a first compensation film disposed at a side of the first polarizing layer provided with the first electrically controlled device is provided. The first and second alignment layers have first and second alignment directions respectively. An included angle between the first and second alignment directions is between 75 degrees and 105 degrees. A phase retardation of the first liquid-crystal layer is between 400 nm and 600 nm or between 800 nm and 1200 nm. The first polarizing layer is disposed at a side of the first alignment layer away from the first liquid-crystal layer, and has a first absorption axis parallel to or perpendicular to the first alignment direction. A display apparatus adopting the electrically controlled panel is also provided.

11 Claims, 12 Drawing Sheets

ELECTRICALLY CONTROLLED PANEL AND DISPLAY APPARATUS

CROSS-REFERENCE TO RELATED APPLICATION

This application claims the priority benefit of China application serial no. 202322577976.2 filed on Sep. 22, 2023. The entirety of the above-mentioned patent application is hereby incorporated by reference herein and made a part of this specification.

BACKGROUND

Field of the Disclosure

The disclosure relates to a panel and an electronic apparatus, and in particular to an electrically controlled panel and a display apparatus.

Description of Related Art

Generally, in order to allow viewers to watch a display image at the same time, a display apparatus usually has a wide viewing angle of display effect. However, in certain situations or occasions, such as when browsing private web pages, confidential information, or entering passwords in public, the wide viewing angle of display effect makes it easy for others to peek at the image and leak confidential information.

Moreover, in order to improve driving safety, current vehicle-mounted display apparatuses may also be designed to have a single-sided privacy protection effect. For example, when the vehicle is moving, whether the bright light of the vehicle-mounted display apparatus (especially at night) interferes with driving, or the display content thereof distracts the driver, driving safety is endangered. However, when the vehicle is stationary, the driver still hopes to be able to view the display content of the vehicle-mounted display apparatus. Therefore, it is an urgent issue to provide a display apparatus with an electrically controllable range of viewing angle and good light filtering capability at privacy angles of view.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the disclosure was acknowledged by a person of ordinary skill in the art.

SUMMARY

An embodiment of the disclosure provides an electrically controlled apparatus. An electrically controlled panel includes a first electrically controlled device, a first polarizing layer, and a first compensation film. The first electrically controlled device includes a first alignment layer, a second alignment layer, and a first liquid-crystal layer. The first alignment layer has a first alignment direction. The second alignment layer has a second alignment direction. The first liquid-crystal layer is disposed between the first alignment layer and the second alignment layer. An included angle between the first alignment direction of the first alignment layer and the second alignment direction of the second alignment layer is between 75 degrees and 105 degrees. A phase retardation of the first liquid-crystal layer is between 400 nm and 600 nm or between 800 nm and 1200 nm. The first polarizing layer is disposed at a side of the first alignment layer away from the first liquid-crystal layer, and has a first absorption axis parallel to or perpendicular to the first alignment direction. The first compensation film is disposed at a side of the first polarizing layer provided with the first electrically controlled device.

An embodiment of the disclosure provides a display apparatus. The display apparatus includes a backlight module, a display panel, a first electrically controlled device, a first polarizing layer, and a first compensation film. The display panel is disposed on the backlight module. The first electrically controlled device is disposed between the backlight module and the display panel, and includes a first alignment layer, a second alignment layer, and a first liquid-crystal layer. The first alignment layer has a first alignment direction. The second alignment layer has a second alignment direction. The first liquid-crystal layer is disposed between the first alignment layer and the second alignment layer. An included angle between the first alignment direction of the first alignment layer and the second alignment direction of the second alignment layer is between 75 degrees and 105 degrees. A phase retardation of the first liquid-crystal layer is between 400 nm and 600 nm or between 800 nm and 1200 nm. The first polarizing layer is disposed between the backlight module and the first electrically controlled device, and has a first absorption axis parallel or perpendicular to the first alignment direction. The first compensation film is disposed between the first polarizing layer and the display panel.

To make the above features and advantages of the disclosure clearer and easier to understand, embodiments will be specifically provided below and described in detain with reference to the accompanying drawings.

DESCRIPTION OF THE EMBODIMENTS

In the following detailed description of the preferred embodiments, reference is made to the accompanying drawings which form a part hereof, and in which are shown by way of illustration specific embodiments in which the disclosure may be practiced. In this regard, directional terminology, such as "top," "bottom," "front," "back," etc., is used with reference to the orientation of the Figure(s) being described. The components of the present disclosure can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present disclosure. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

The disclosure provides an electrically controlled panel having better electrically controlled light filtering effect within a specific range of viewing angle. The disclosure provides a display apparatus that may effectively suppress light leakage at a large viewing angle in a narrow viewing angle mode.

Figure 1:
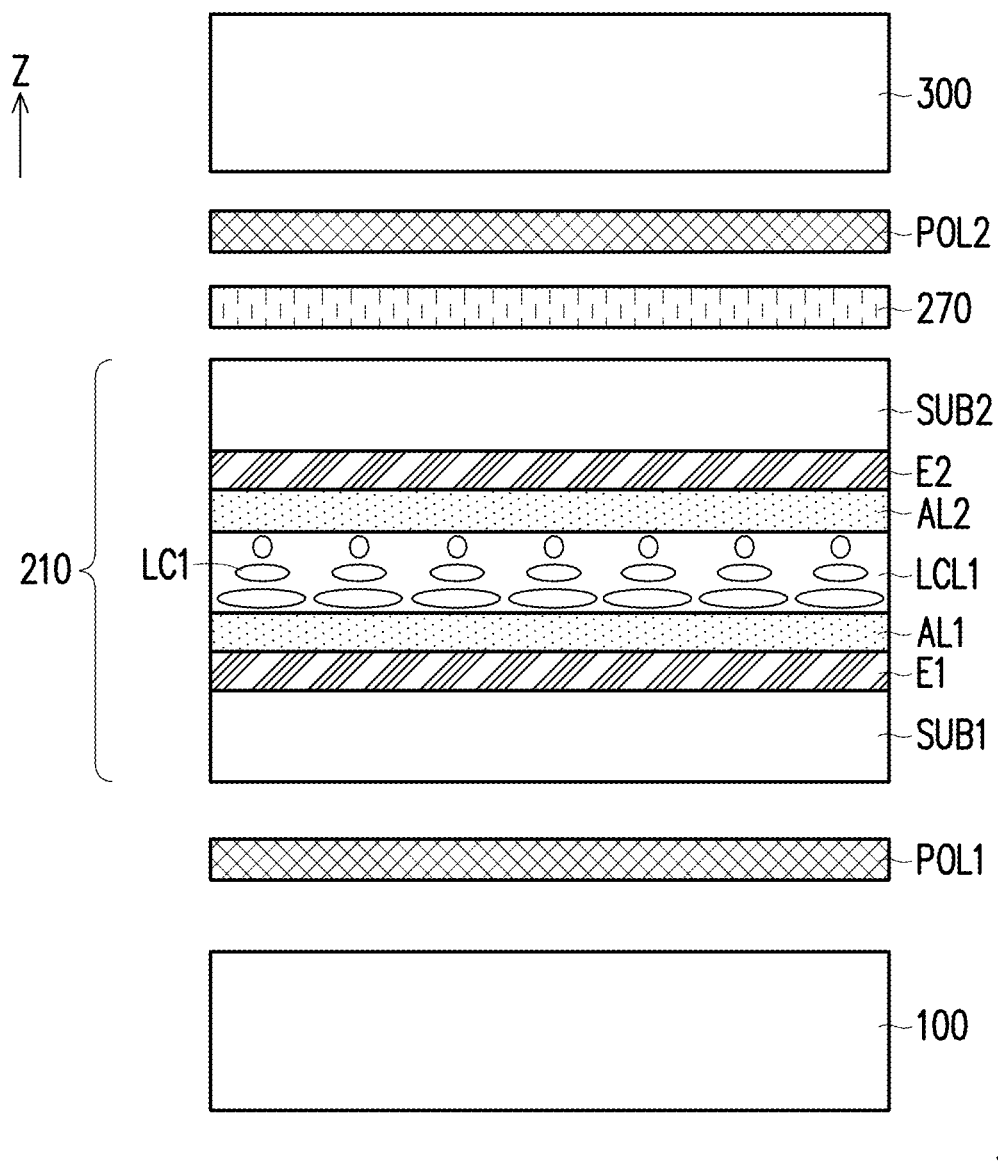
FIG. 1 is a schematic cross-sectional view of a display apparatus according to the first embodiment of the disclosure.
Figure 2:
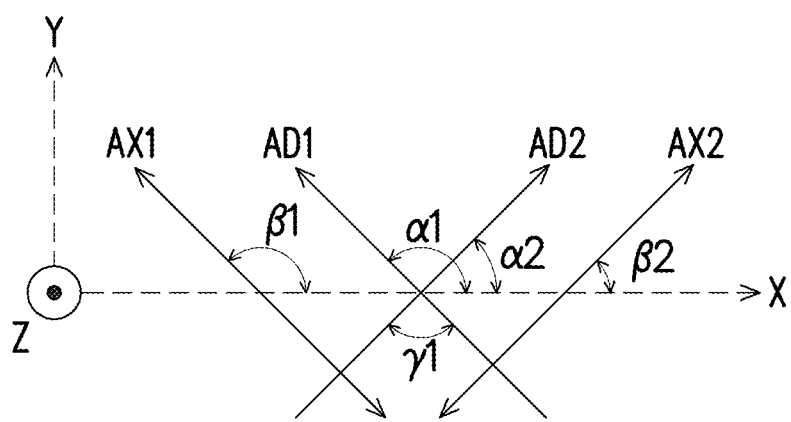
FIG. 2 is a schematic diagram of the arrangement relationship between the alignment direction of the alignment layer and the axial direction of the absorption axis of the polarizing layer of FIG. 1.
Figure 3A:
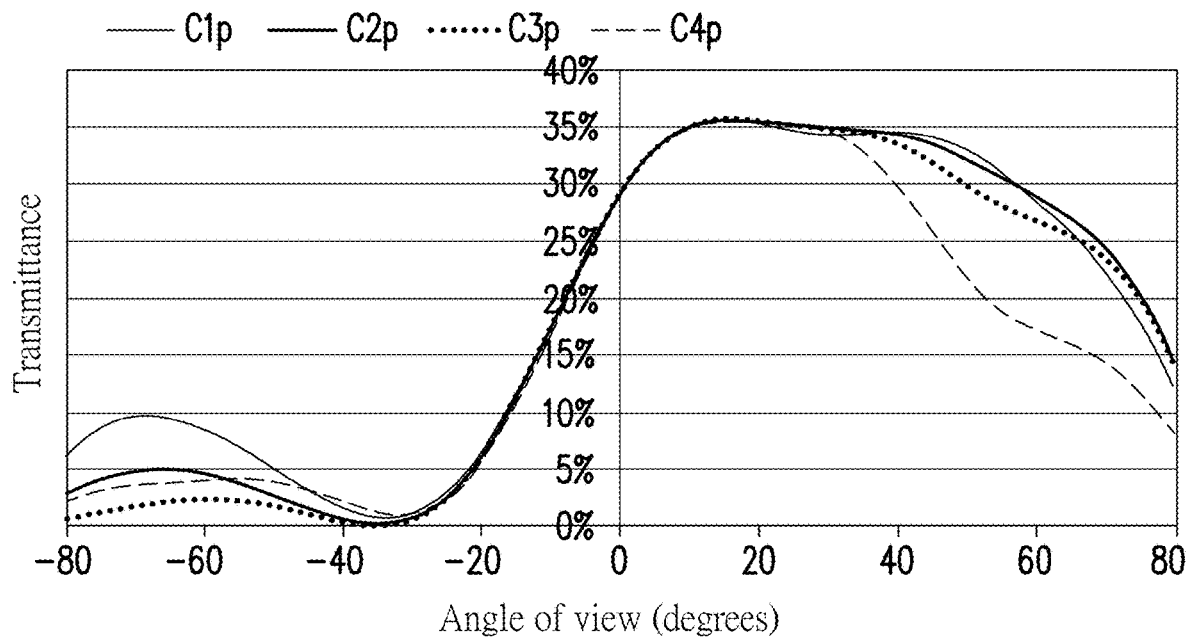
FIG. 3A is a graph of transmittance versus angle of view when the display apparatus of the comparative example and the display apparatus of FIG. 1 each have a liquid-crystal layer having a phase retardation of 1070.6 nm and operated in a narrow viewing angle mode.
Figure 3B:
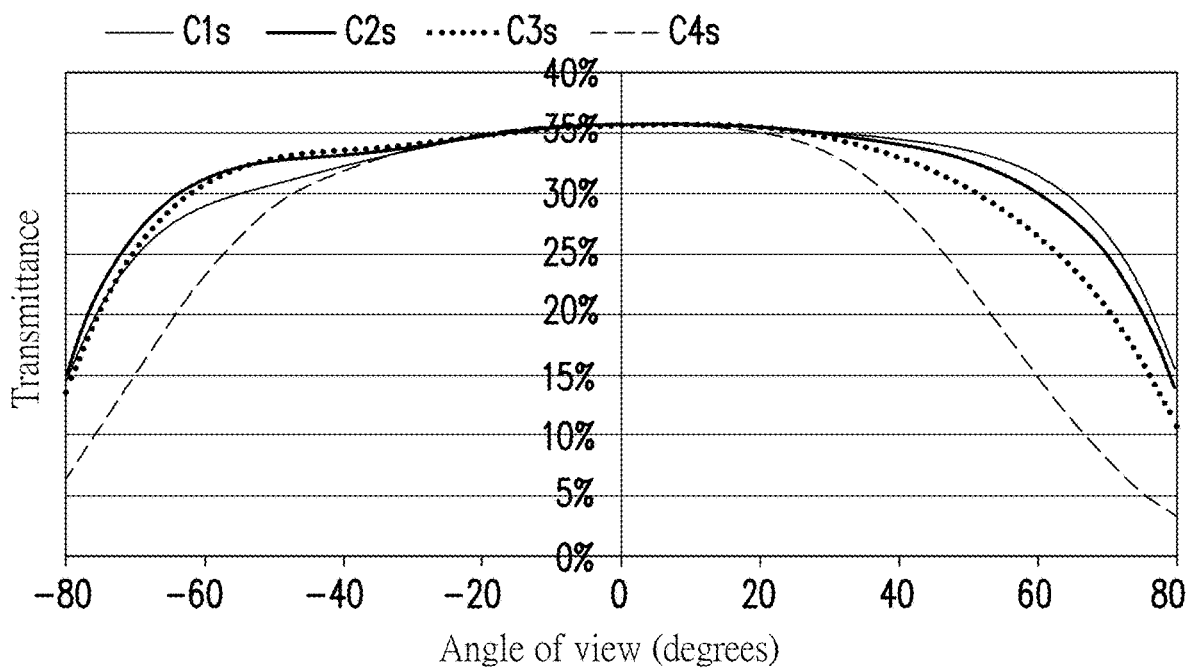
FIG. 3B is a graph of transmittance versus angle of view when the display apparatus of the comparative example and the display apparatus of FIG. 1 each have a liquid-crystal layer having a phase retardation of 1070.6 nm and operated in a wide viewing angle mode.

FIG. 1 is a schematic cross-sectional view of a display apparatus according to the first embodiment of the disclosure. FIG. 2 is a schematic diagram of the arrangement relationship between the alignment directions of the alignment layers and the axial directions of the absorption axes of the polarizing layers of FIG. 1. FIG. 3A is a graph of transmittance versus angle of view when the display apparatus of the comparative example and the display apparatus of FIG. 1 each have a liquid-crystal layer having a phase retardation of 1070.6 nm and operated in a narrow viewing angle mode. FIG. 3B is a graph of transmittance versus angle of view when the display apparatus of the comparative example and the display apparatus of FIG. 1 each have a liquid-crystal layer having a phase retardation of 1070.6 nm and operated in a wide viewing angle mode.

Referring to FIG. 1, a display apparatus 10 includes a backlight module 100, a first electrically controlled device 210, a first polarizing layer POL1, a second polarizing layer POL2, a compensation film 270, and a display panel 300. The first electrically controlled device 210 is disposed on the backlight module 100. The display panel 300 is disposed on the first electrically controlled device 210. The first polarizing layer POL1 is disposed between the backlight module 100 and the first electrically controlled device 210. The second polarizing layer POL2 is disposed between the first electrically controlled device 210 and the display panel 300. The compensation film 270 is disposed between the first polarizing layer POL1 and the second polarizing layer POL2.

In other words, in the present embodiment, the first polarizing layer POL1, the first electrically controlled device 210, the second polarizing layer POL2, and the display panel 300 are sequentially disposed on the backlight module 100 along a direction Z (as shown in FIG. 1). It should be mentioned that, in the present embodiment, the compensation film 270 may be optionally disposed between the first electrically controlled device 210 and the second polarizing layer POL2. However, in another modified embodiment, the compensation film 270 may also be disposed between the first electrically controlled device 210 and the first polarizing layer POL1. The display panel 300 is, for example, a liquid-crystal display panel or other suitable non-self-luminous display panel.

It should be mentioned that, the first polarizing layer POL1, the second polarizing layer POL2, the first electrically controlled device 210, and the compensation film 270 may form the electrically controlled panel of the display apparatus 10. That is, the remaining members in the display apparatus 10 except the backlight module 100 and the display panel 300 may define the electrically controlled panel of the present embodiment. In the present embodiment, each of the first polarizing layer POL1, the second polarizing layer POL2, and the compensation film 270 may be independent films, such as a polarizer and a phase retarder, but not limited thereto. In other embodiments, the compensation film 270 and the second polarizing layer POL2 (or the compensation film 270 and the first polarizing layer POL1) may be integrated into a single polarizer having a phase compensation function. It should be mentioned that, in another modified embodiment, if the display panel 300 is a liquid-crystal display panel and a polarizer of the display panel 300 is provided at a side facing the first electrically controlled device 210, there is no need to provide the second polarizing layer POL2 of the present embodiment. That is, the electrically controlled panel and the display panel 300 may share the same polarizing layer. In other words, the second polarizing layer POL2 is the polarizer of the display panel 300 closed to the first electrically controlled device 210.

Specifically, the first electrically controlled device 210 includes a first substrate SUB1, a second substrate SUB2, a first electrode layer E1, a second electrode layer E2, a first alignment layer AL1, a second alignment layer AL2, and a first liquid-crystal layer LCL1. The first electrode layer E1 and the first alignment layer AL1 are provided on a side surface of the first substrate SUB1 facing the second substrate SUB2. The second electrode layer E2 and the second alignment layer AL2 are provided on a side surface of the second substrate SUB2 facing the first substrate SUB1. The first liquid-crystal layer LCL1 is sandwiched between the first alignment layer AL1 and the second alignment layer AL2.

Please refer to FIG. 1 and FIG. 2 simultaneously. An included angle γ1 between a first alignment direction AD1 of the first alignment layer AL1 and a second alignment direction AD2 of the second alignment layer AL2 is between 75 degrees and 105 degrees. In the present embodiment, the included angle γ1 between the first alignment direction AD1 and the second alignment direction AD2 is, for example, 90 degrees. In other words, a plurality of liquid-crystal molecules LC1 of the first liquid-crystal layer LCL1 are in a twisted arrangement along the direction Z (as shown in FIG. 1), that is, the first electrically controlled device 210 may be a twisted nematic (TN)-type electrically controlled liquid-crystal cell.

It should be mentioned that, the phase retardation of the first liquid-crystal layer LCL1 is between 400 nm and 600 nm or between 800 nm and 1200 nm. In the present embodiment, the phase retardation of the first liquid-crystal layer LCL1 may be optionally between 800 nm and 1200 nm, for example, 1070.6 nm.

In the present embodiment, the display apparatus 10 has a first viewing angle control axial direction parallel to a direction X (for example, perpendicular to the direction Z). More specifically, the viewing angle range of the display apparatus 10 along the first viewing angle control axial direction is electrically controllable and adjustable. In the present embodiment, the first alignment direction AD1 of the first alignment layer AL1 is perpendicular to the second alignment direction AD2 of the second alignment layer AL2, wherein an included angle α1 between the first alignment direction AD1 and the direction X is, for example, 135 degrees, and an included angle α2 between the second alignment direction AD2 and the direction X is, for example, 45 degrees, but not limited thereto. In another embodiment, the included angle α1 may also be 45 degrees, and the included angle α2 may also be 135 degrees.

Preferably, in the present embodiment, the axial direction of a first absorption axis AX1 of the first polarizing layer POL1 may be optionally parallel to the first alignment direction AD1 of the first alignment layer AL1, and the axial direction of a second absorption axis AX2 of the second polarizing layer POL2 may be optionally parallel to the second alignment direction AD2 of the second alignment layer AL2. That is, the axial direction of the first absorption axis AX1 is perpendicular to the axial direction of the second absorption axis AX2, an included angle β1 between the first absorption axis AX1 and the direction X is 135 degrees, and an included angle β2 between the second absorption axis AX2 and the direction X is 45 degrees. However, the disclosure is not limited thereto. In other embodiments, the axial direction of the first absorption axis AX1 of the first polarizing layer POL1 may be perpendicular to the first alignment direction AD1 of the first alignment layer AL1, and the axial direction of the second absorption axis AX2 of the second polarizing layer POL2 may be perpendicular to the second alignment direction AD2 of the second alignment layer AL2.

Moreover, the out-of-plane phase retardation of the compensation film 270 is between −50 nm and −200 nm or −100 nm and −400 nm. In the present embodiment, the out-of-plane phase retardation of the compensation film 270 may preferably be between −100 nm and −400 nm. The out-of-plane phase retardation here is defined by $$\left(\frac{nx + ny}{2} - nz\right) \times d,$$

for example, wherein nx, ny, and nz are the refractive indices of the compensation film 270 along the direction X, the direction Y, and the direction Z respectively, and d is the film thickness of the compensation film 270 along the direction Z. For example, the compensation film 270 is a C-plate compensation film.

For example, in the present embodiment, when the first electrode layer E1 and the second electrode layer E2 of the first electrically controlled device 210 are not enabled, the viewing angle ranges of the display apparatus 10 at different azimuth angles on the XY plane are all substantially the same. When the first electrode layer E1 and the second electrode layer E2 of the first electrically controlled device 210 are enabled, the display apparatus 10 has a narrower viewing angle range in the direction parallel to the direction X. For example, the light emission in the side viewing angle range at a side of the normal view direction may all be effectively suppressed. Therefore, the direction parallel or anti-parallel to the direction X in FIG. 2 may be defined as the first viewing angle control axial direction of the display apparatus 10. It should be noted that the distribution of angles of view of the display apparatus 10 at this time is asymmetrical relative to the angle of normal view.

Referring to FIG. 3A, a curve C1p is a distribution curve of transmittance versus angle of view parallel to the direction X when the display apparatus of the comparative example is operated in a narrow viewing angle mode. Here, the only difference between the display apparatus of the comparative example and the display apparatus 10 of FIG. 1 is that the display apparatus of the comparative example does not have the compensation film 270 of FIG. 1. A curve C2p, a curve C3p, and a curve C4p are distribution curves of transmittance versus angle of view parallel to the direction X when the out-of-plane phase retardation of the compensation film 270 of the display apparatus 10 is −100 nm, −200 nm, and −400 nm respectively and the display apparatus 10 is operated in a narrow viewing angle mode.

It may be seen from FIG. 3A that the transmittance of the display apparatus of the comparative example is still greater than 5% in the side viewing angle range of −50 degrees to −80 degrees. That is, the display apparatus of the comparative example still has significant light leakage in the side viewing angle range. In comparison, since the display apparatus 10 of the present embodiment is provided with the compensation film 270, the transmittance of the display apparatus 10 in the side viewing angle range (e.g., −50 degrees to −80 degrees) may be controlled at 5% or less. In other words, the configuration of the compensation film 270 may improve the light filtering capability of the display apparatus 10 within the side viewing angle range.

Moreover, FIG. 3A also shows that when the out-of-plane phase retardation of the compensation film 270 is −200 nm, both the light filtering effect of the display apparatus 10 in the side viewing angle range and the transmittance performance in the other side viewing angle range in the normal view direction (for example, the greater the transmittance, the better) may be taken into consideration.

Referring to FIG. 3B, a curve C1s is a distribution curve of transmittance versus angle of view parallel to the direction X when the display apparatus of the comparative example is operated in a wide viewing angle mode. A curve C2s, a curve C3s, and a curve C4s are distribution curves of transmittance versus angle of view parallel to the direction X when the out-of-plane phase retardation of the compensation film 270 of the display apparatus 10 is −100 nm, −200 nm, and −400 nm respectively and the display apparatus 10 is operated in a wide viewing angle mode. In addition to the relatively worse transmittance performance of the display apparatus 10 when the out-of-plane phase retardation of the compensation film 270 is −400 nm, when the out-of-plane phase retardation of the compensation film 270 is −100 nm or −200 nm, the transmittance distribution of the display apparatus 10 is equivalent to the display apparatus of the comparative example.

It may be seen from FIG. 3A and FIG. 3B that in the display apparatus 10 of the present embodiment, when the phase retardation of the first liquid-crystal layer LCL1 is 1070.6 nm, a preferred value of the out-of-plane phase retardation of the compensation film 270 is, for example, −200 nm. However, the disclosure is not limited thereto.

Figure 4A:
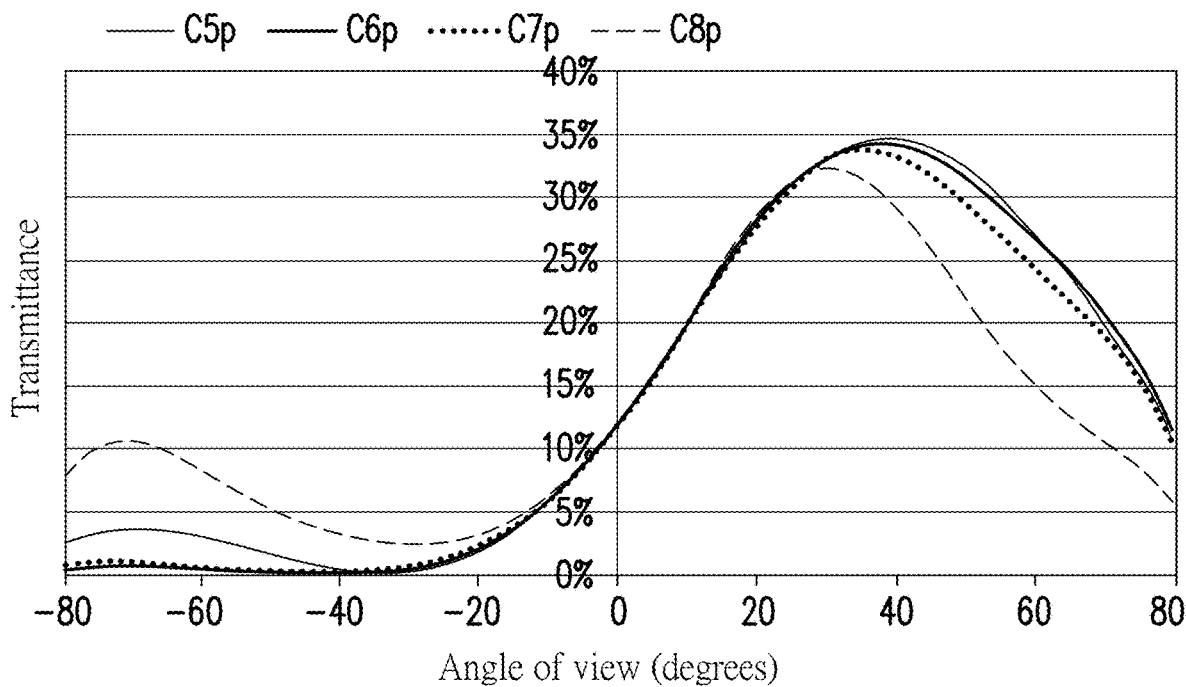
FIG. 4A is a graph of transmittance versus angle of view when the display apparatus of the comparative example and the display apparatus of FIG. 1 each have a liquid-crystal layer having a phase retardation of 475 nm and operated in a narrow viewing angle mode.
Figure 4B:
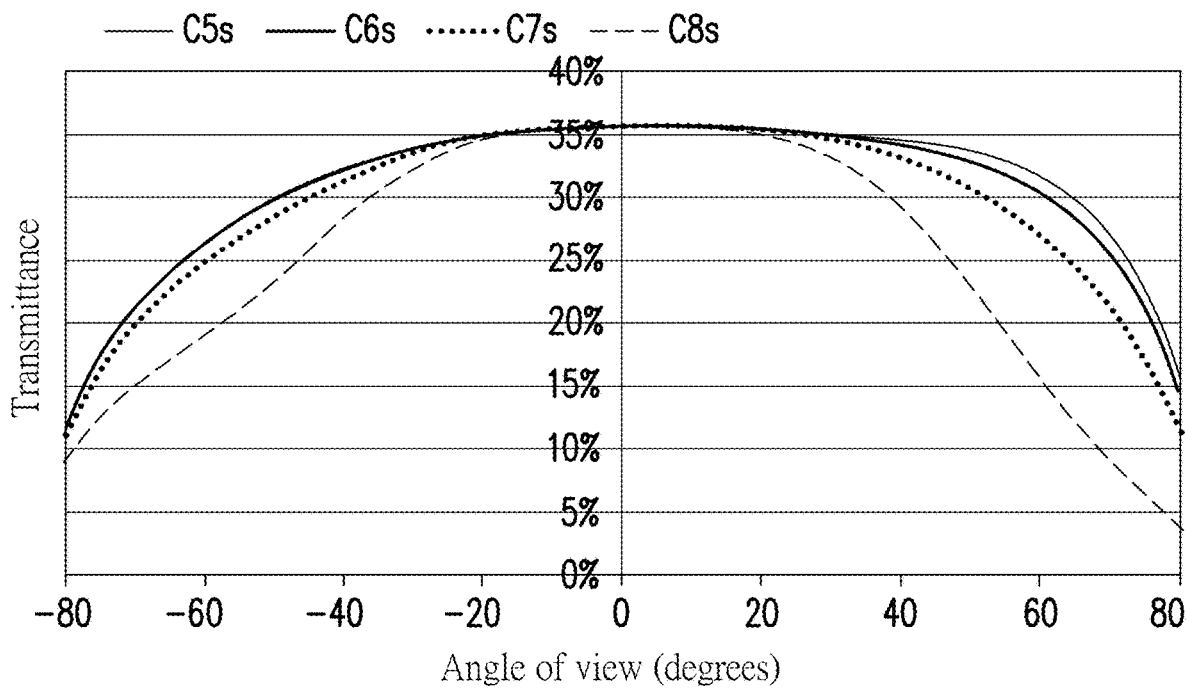
FIG. 4B is a graph of transmittance versus angle of view when the display apparatus of the comparative example and the display apparatus of FIG. 1 each have a liquid-crystal layer having a phase retardation of 475 nm and operated in a wide viewing angle mode.

FIG. 4A is a graph of transmittance versus angle of view when the display apparatus of the comparative example and the display apparatus of FIG. 1 each have a liquid-crystal layer having a phase retardation of 475 nm and operated in a narrow viewing angle mode. FIG. 4B is a graph of transmittance versus angle of view when the display apparatus of the comparative example and the display apparatus of FIG. 1 each have a liquid-crystal layer having a phase retardation of 475 nm and operated in a wide viewing angle mode.

Referring to FIG. 1, FIG. 2, FIG. 4A, a curve C5p is a distribution curve of transmittance versus angle of view parallel to the direction X when the display apparatus of the comparative example is operated in a narrow viewing angle mode. A curve C6p, a curve C7p, and a curve C8p are distribution curves of transmittance versus angle of view parallel to the direction X when the out-of-plane phase retardation of the compensation film 270 of the display apparatus 10 is −100 nm, −200 nm, and −400 nm respectively and the display apparatus 10 is operated in a narrow viewing angle mode.

It may be known from FIG. 4A that, when the phase retardation of the first liquid-crystal layer LCL1 of each of the display apparatus of the comparative example and the display apparatus 10 of the present embodiment is reduced from 1070.6 nm to 475 nm, the respective transmittances thereof in the side viewing angle range of −50 degrees to −80 degrees may be further reduced. Even so, in addition to the relatively worse transmittance performance of the display apparatus 10 when the out-of-plane phase retardation of the compensation film 270 is −400 nm, when the out-of-plane phase retardation of the compensation film 270 is −100 nm or −200 nm, the transmittance of the display apparatus 10 within the viewing angle range of that side is always less than that of the display apparatus of the comparative example.

Referring to FIG. 1, FIG. 2, FIG. 4B, a curve C5s is a distribution curve of transmittance versus angle of view parallel to the direction X when the display apparatus of the comparative example is operated in a wide viewing angle mode. A curve C6s, a curve C7s, and a curve C8s are distribution curves of transmittance versus angle of view parallel to the direction X when the out-of-plane phase retardation of the compensation film 270 of the display apparatus 10 is −100 nm, −200 nm, and −400 nm respectively and the display apparatus 10 is operated in a wide viewing angle mode. In addition to the relatively worse transmittance performance of the display apparatus 10 when the out-of-plane phase retardation of the compensation film 270 is −400 nm, when the out-of-plane phase retardation of the compensation film 270 is −100 nm or −200 nm, the transmittance distribution of the display apparatus 10 is equivalent to the display apparatus of the comparative example.

It may be seen from FIG. 4A and FIG. 4B that in the display apparatus 10 of the present embodiment, when the phase retardation of the first liquid-crystal layer LCL1 is 475 nm, a preferred value of the out-of-plane phase retardation of the compensation film 270 is, for example, −100 nm.

It should be mentioned that, when the phase retardation of the first liquid-crystal layer LCL1 of the first electrically controlled device 210 is reduced from 1070.6 nm to 475 nm, the optimal value of the out-of-plane phase retardation of the compensation film 270 of the display apparatus 10 is also reduced from −200 nm to −100 nm. In other words, the greater the phase retardation of the first electrically controlled device 210 is, the greater the absolute value of the optimal value of the out-of-plane phase retardation of the compensation film 270 is.

In the present embodiment, the compensation film 270 is, for example, a positive C-plate compensation film having a single optical axis. However, the disclosure is not limited thereto.

Figure 5:
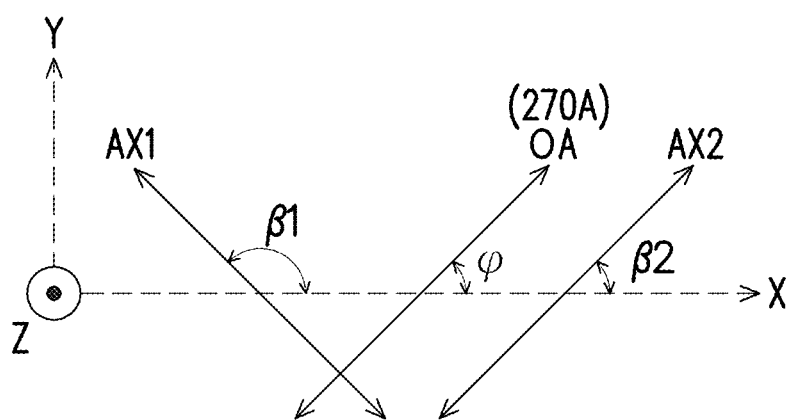
FIG. 5 is a schematic diagram of the arrangement relationship between the axial direction of the optical axis and the axial direction of the absorption axis of the polarizing layer when the first compensation film of FIG. 1 is a biaxial compensation film.
Figure 6A:
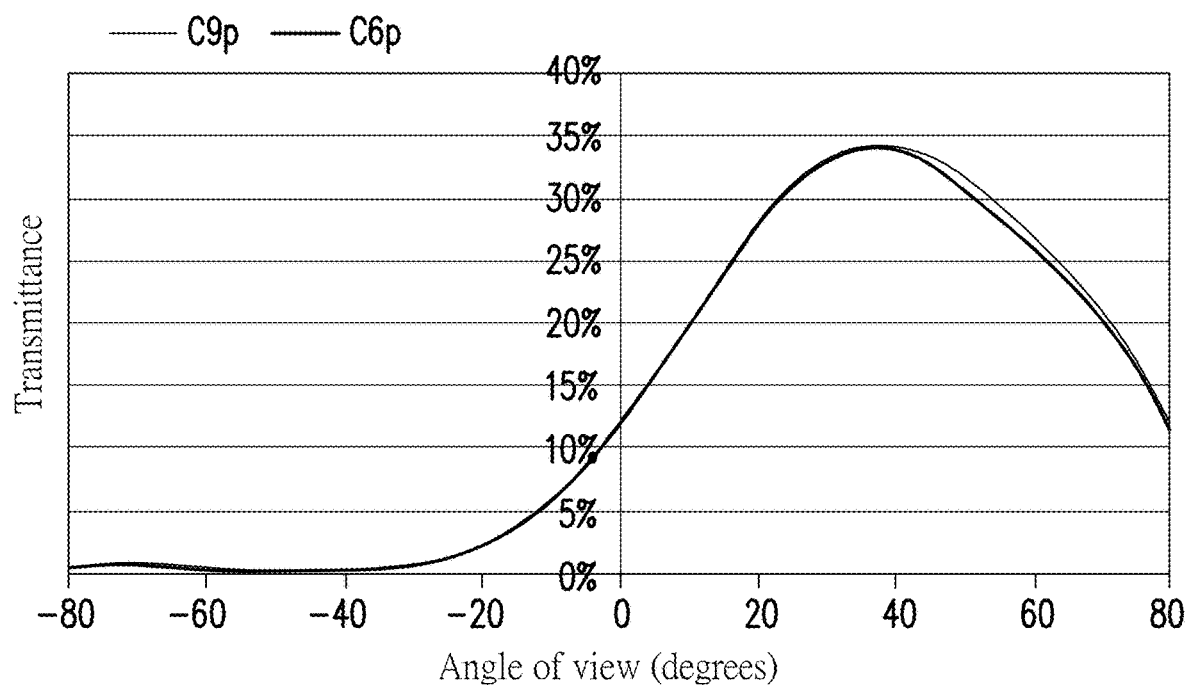
FIG. 6A is a graph of transmittance versus angle of view when the display apparatus of FIG. 1 has the configuration of FIG. 5 and a liquid-crystal layer having a phase retardation of 475 nm and operated in a narrow viewing angle mode.
Figure 6B:
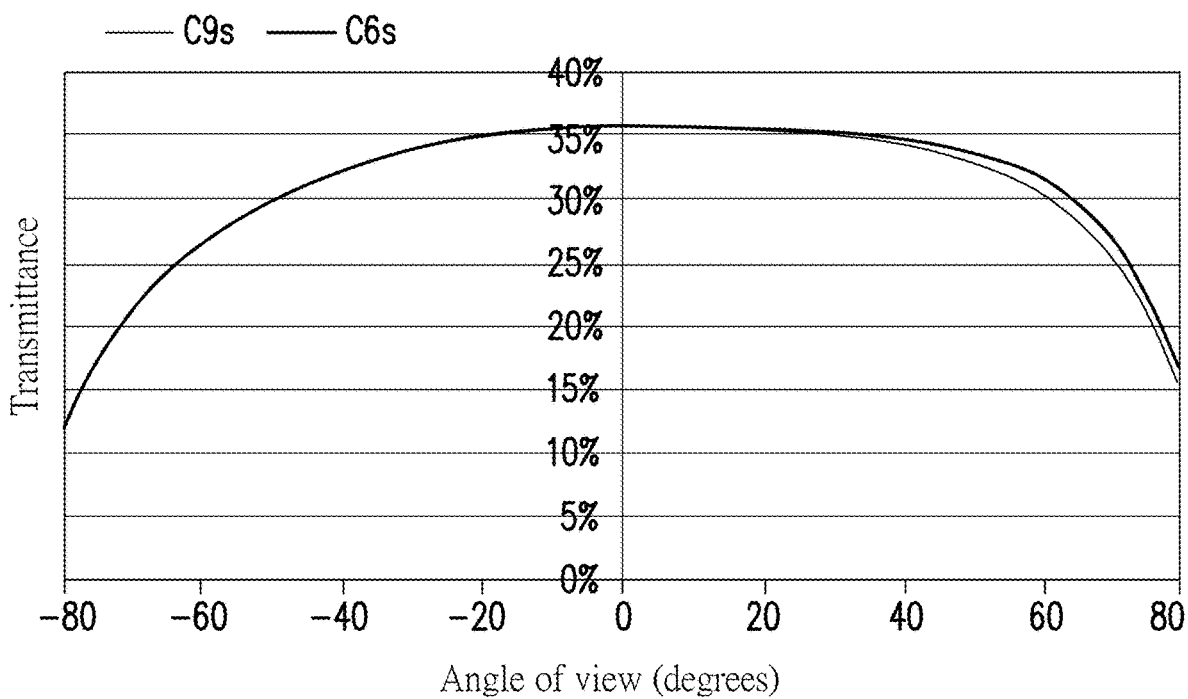
FIG. 6B is a graph of transmittance versus angle of view when the display apparatus of FIG. 1 has the configuration of FIG. 5 and a liquid-crystal layer having a phase retardation of 475 nm and operated in a wide viewing angle mode.

FIG. 5 is a schematic diagram of the arrangement relationship between the axial direction of the optical axis and the axial direction of the absorption axis of the polarizing layer when the compensation film of FIG. 1 is a biaxial compensation film. FIG. 6A is a graph of transmittance versus angle of view when the display apparatus of FIG. 1 has the configuration of FIG. 5 and a liquid-crystal layer having a phase retardation of 475 nm and operated in a narrow viewing angle mode. FIG. 6B is a graph of transmittance versus angle of view when the display apparatus of FIG. 1 has the configuration of FIG. 5 and a liquid-crystal layer having a phase retardation of 475 nm and operated in a wide viewing angle mode.

Referring to FIG. 1 and FIG. 5, in the present embodiment, the compensation film 270 of the display apparatus 10 may also be replaced by a biaxial compensation film 270A, wherein the biaxial compensation film 270A has an in-plane phase retardation along an optical axis OA, and the axial direction of the optical axis OA may be parallel or perpendicular to the first absorption axis AX1 of the first polarizing layer POL1 or the second absorption axis AX2 of the second polarizing layer POL2. For example, in the present embodiment, the optical axis OA of the biaxial compensation film 270A is parallel to the second absorption axis AX2 and perpendicular to the first absorption axis AX1. That is, an included angle φ between the optical axis OA of the biaxial compensation film 270A and the direction X is 45 degrees, but not limited thereto. In other embodiments, the optical axis OA of the biaxial compensation film 270A may be perpendicular to the second absorption axis AX2 and parallel to the first absorption axis AX1.

Please refer to FIG. 5, FIG. 6A, and FIG. 6B, the curve C6p is a distribution curve of transmittance versus angle of view parallel to the direction X when the out-of-plane phase retardation of the compensation film 270 of the display apparatus 10 is −100 nm and the display apparatus 10 is operated in a narrow viewing angle mode. A curve C9p is a distribution curve of transmittance versus angle of view parallel to the direction X when the compensation film of the display apparatus 10 is the biaxial compensation film 270A and the display apparatus 10 is operated in a narrow viewing angle mode. The curve C6s is a distribution curve of transmittance versus angle of view parallel to the direction X when the out-of-plane phase retardation of the compensation film 270 of the display apparatus 10 is −100 nm and the display apparatus 10 is operated in a wide viewing angle mode. A curve C9s is a distribution curve of transmittance versus angle of view parallel to the direction X when the compensation film of the display apparatus 10 is the biaxial compensation film 270A and the display apparatus 10 is operated in a wide viewing angle mode. In particular, the in-plane phase retardation (RO) of the biaxial compensation film 270A is, for example, 50 nm, and the out-of-plane phase retardation (Rth) thereof is, for example, −150 nm.

It may be known from FIG. 6A and FIG. 6B that, regardless of whether the display apparatus 10 adopts the single optical axis compensation film 270 or the biaxial compensation film 270A, the transmittance thereof is not differed significantly in the distribution of angles of view when operated in a narrow viewing angle mode or a wide viewing angle mode; for example: both may effectively suppress the light leakage of the display apparatus 10 operated in the narrow viewing angle mode in the side viewing angle range of −50 degrees to −80 degrees.

In the following, other embodiments are provided to explain the disclosure in detail. The same members are labeled with the same reference numerals, and the description of the same technical content is omitted. For the omitted portions, please refer to the above embodiments, which is not described again below.

Figure 7:
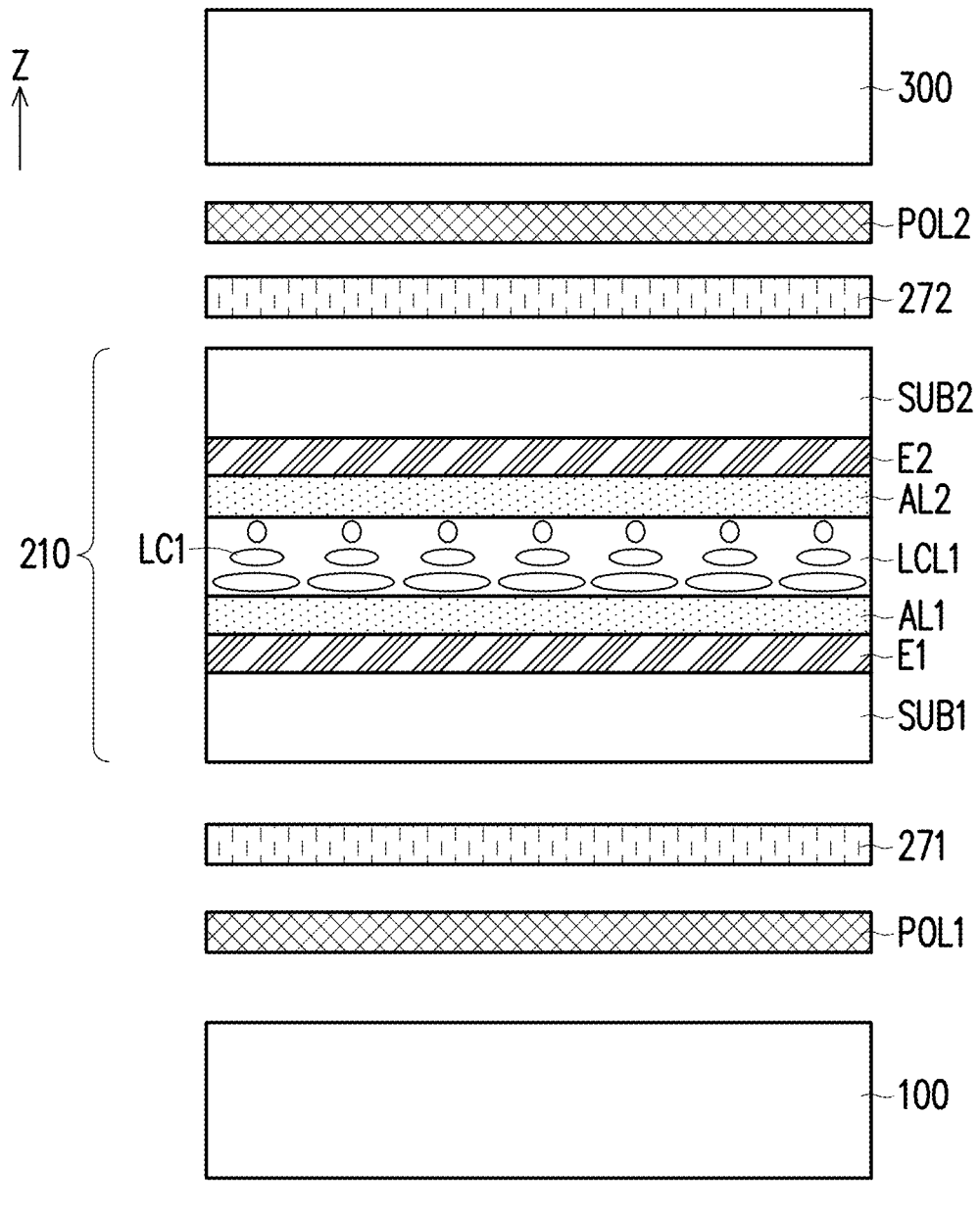
FIG. 7 is a schematic cross-sectional view of a display apparatus according to the second embodiment of the disclosure.
Figure 8A:
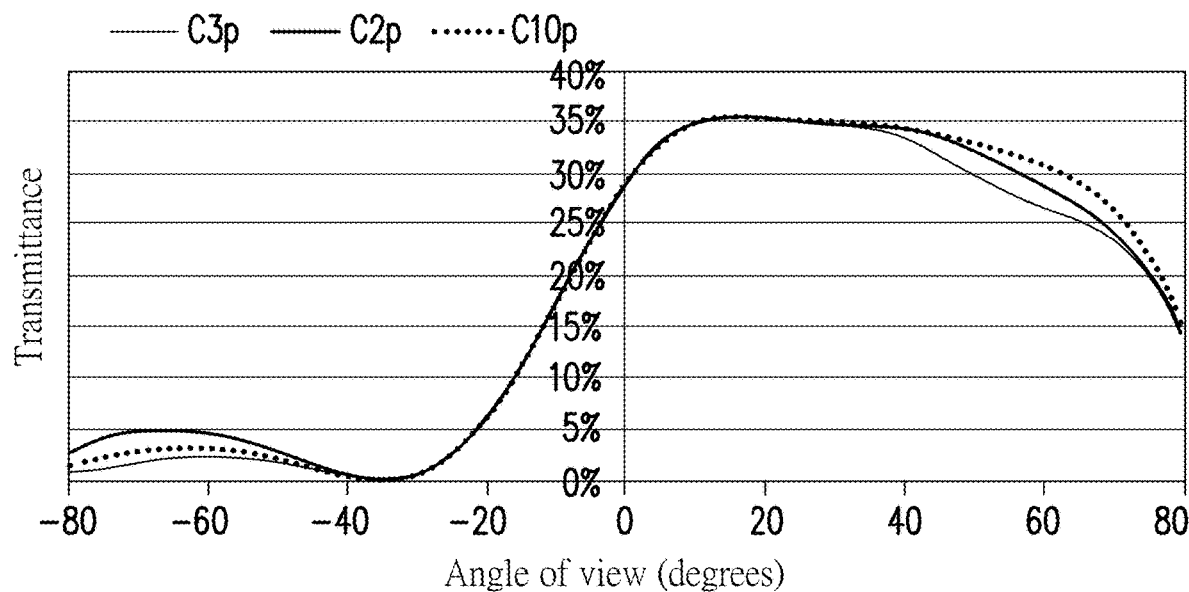
FIG. 8A is a graph of transmittance versus angle of view when the display apparatus of FIG. 7 has a liquid-crystal layer having a phase retardation of 1070.6 nm and operated in a narrow viewing angle mode.
Figure 8B:
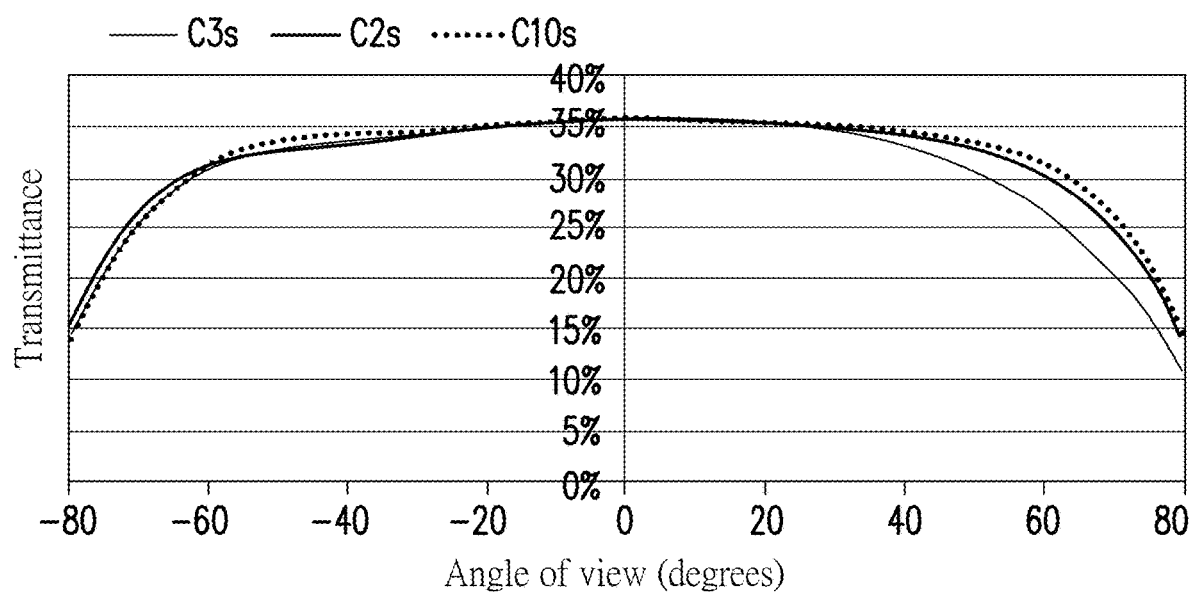
FIG. 8B is a graph of transmittance versus angle of view when the display apparatus of FIG. 7 has a liquid-crystal layer having a phase retardation of 1070.6 nm and operated in a wide viewing angle mode.

FIG. 7 is a schematic cross-sectional view of a display apparatus according to the second embodiment of the disclosure. FIG. 8A is a graph of transmittance versus angle of view when the display apparatus of FIG. 7 has a liquid-crystal layer having a phase retardation of 1070.6 nm and operated in a narrow viewing angle mode. FIG. 8B is a graph of transmittance versus angle of view when the display apparatus of FIG. 7 has a liquid-crystal layer having a phase retardation of 1070.6 nm and operated in a wide viewing angle mode.

Please refer to FIG. 7. The difference between a display apparatus 20 of the present embodiment and the display apparatus 10 of FIG. 1 is that the number of compensation films is different. For example, in the present embodiment, the number of compensation films of the display apparatus 20 (or electrically controlled panel) is two, such as a first compensation film 271 and a second compensation film 272. The first compensation film 271 is disposed between the first electrically controlled device 210 and the first polarizing layer POL1. The second compensation film 272 is disposed between the first electrically controlled device 210 and the second polarizing layer POL2.

It should be noted that, in the present embodiment, the sum of the out-of-plane phase retardation of the first compensation film 271 and the out-of-plane phase retardation of the second compensation film 272 is between −100 nm and −400 nm or between −50 nm and −200 nm. For example, in the present embodiment, the phase retardation of the first liquid-crystal layer LCL1 is 1070.6 nm, the out-of-plane phase retardation of the first compensation film 271 and the second compensation film 272 are equal to each other, and both are −100 nm.

Referring to FIG. 8A and FIG. 8B, the curve C2p and the curve C3p are distribution curves of transmittance versus angle of view parallel to the direction X when the out-of-plane phase retardation of the compensation film 270 of the display apparatus 10 of FIG. 1 is −100 nm and −200 nm respectively and the display apparatus 10 is operated in a narrow viewing angle mode. A curve C10p is a distribution curve of transmittance vs angle of view parallel to the direction X when the out-of-plane phase retardation of each of the two compensation films of the display apparatus 20 (as shown in FIG. 7) of the present embodiment is −100 nm and the display apparatus 20 is operated in the narrow viewing angle mode. The curve C2s and the curve C3s are distribution curves of transmittance versus angle of view parallel to the direction X when the out-of-plane phase retardation of the compensation film 270 of the display apparatus 10 is −100 nm and −200 nm respectively and the display apparatus 10 of FIG. 1 is operated in a wide viewing angle mode. A curve C10s is a distribution curve of transmittance vs angle of view parallel to the direction X when the out-of-plane phase retardation of each of the two compensation films of the display apparatus 20 of the present embodiment is −100 nm and the display apparatus 20 is operated in the wide viewing angle mode.

It may be known from the figure that for the display apparatus 20 having the first compensation film 271 and the second compensation film 272, wherein the sum of out-of-plane phase retardations of the two compensation films is −200 nm, the performance of the transmittance at different angles of view is roughly equivalent to the performance of the transmittance at different angles of view of the display apparatus 10 in which the out-of-plane phase retardation of the compensation film 270 is −200 nm.

It should be mentioned that, in the present embodiment, since the first compensation film 271 and the second compensation film 272 are respectively provided at two opposite sides of the first electrically controlled device 210, and the out-of-plane phase retardations of the two compensation films are equal to each other, when the display apparatus 20 is operated in a wide viewing angle mode, the chromaticity difference between the angle of normal view and the side angle of view of the display image may be effectively reduced.

Figure 9:
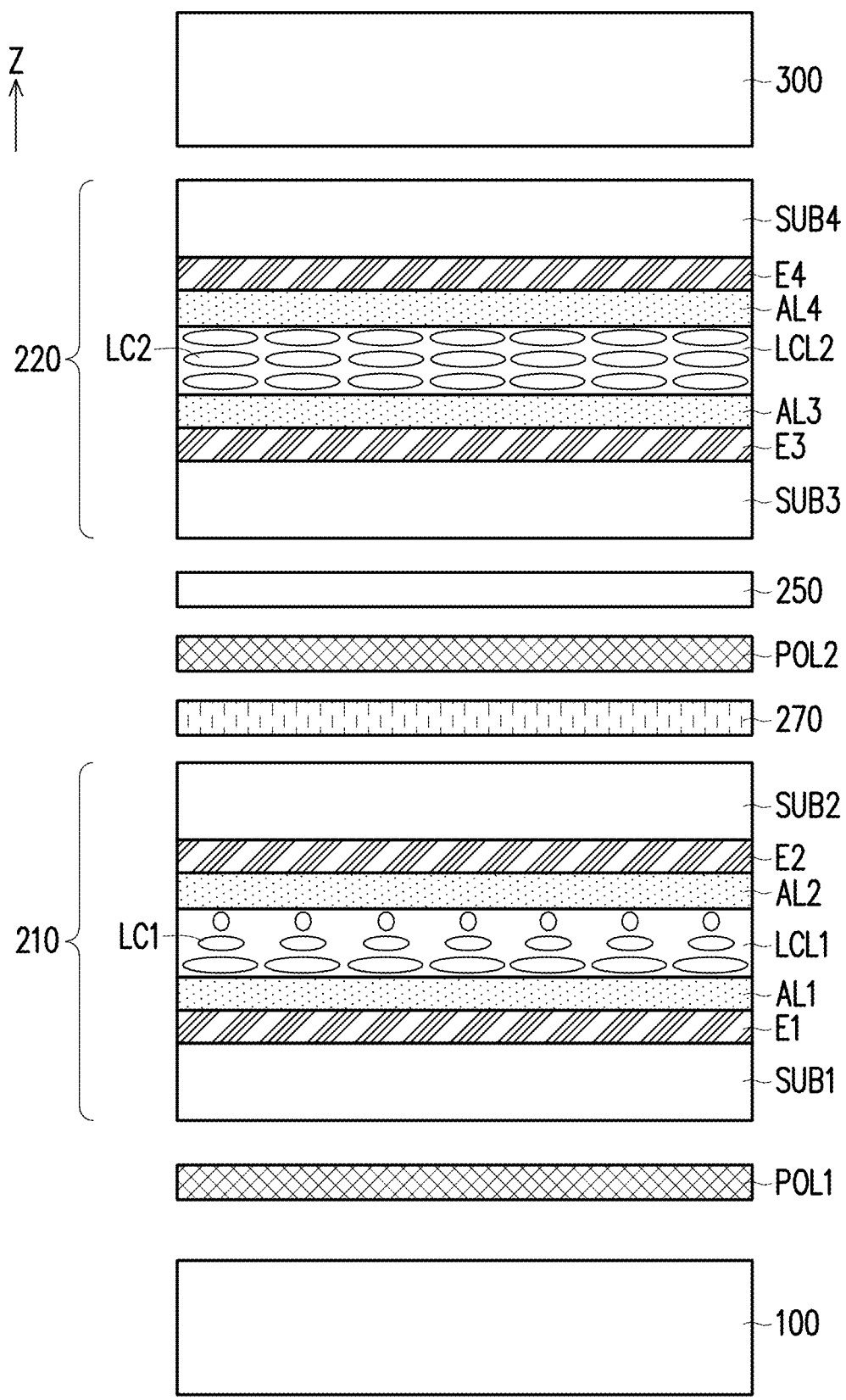
FIG. 9 is a schematic cross-sectional view of a display apparatus according to the third embodiment of the disclosure.
Figure 10:
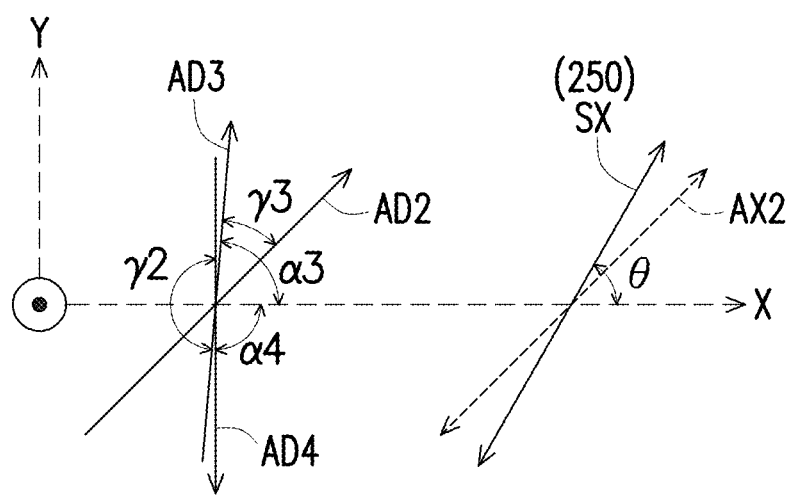
FIG. 10 is a schematic diagram of the arrangement relationship between the alignment direction of the alignment layer, the axial direction of the absorption axis of the polarizing layer, and the axial direction of the slow axis of the half-wave plate of FIG. 9.

FIG. 9 is a schematic cross-sectional view of a display apparatus according to the third embodiment of the disclosure. FIG. 10 is a schematic diagram of the arrangement relationship between the alignment direction of the alignment layer, the axial direction of the absorption axis of the polarizing layer, and the axial direction of the slow axis of the half-wave plate of FIG. 9.

Please refer to FIG. 9. The main difference between a display apparatus 30 of the present embodiment and the display apparatus 10 of FIG. 1 is that the number of electrically controlled devices is different. For example, in the present embodiment, the display apparatus 30 (or electrically controlled panel) further includes a second electrically controlled device 220 and a half-wave plate 250. The second electrically controlled device 220 is disposed between the first electrically controlled device 210 (or the second polarizing layer POL2) and the display panel 300. The half-wave plate 250 is disposed between the second polarizing layer POL2 and the second electrically controlled device 220.

Since the structural composition and configuration relationship of the first electrically controlled device 210 and the compensation film 270 of the present embodiment are all similar to the first electrically controlled device 210 and the compensation film 270 of FIG. 1, for detailed description, please refer to the relevant paragraphs of the above embodiments. Therefore, the display apparatus 30 of the present embodiment also has the related technical effects produced by the configuration relationship between the phase retardation of the first liquid-crystal layer LCL1 and the out-of-plane phase retardation of the compensation film 270 in the previous embodiment, which are not described again here.

Specifically, the second electrically controlled device 220 includes a third substrate SUB3, a fourth substrate SUB4, a third electrode layer E3, a fourth electrode layer E4, a third alignment layer AL3, a fourth alignment layer AL4, and a second liquid-crystal layer LCL2. The third electrode layer E3 and the third alignment layer AL3 are provided on a side surface of the third substrate SUB3 facing the fourth substrate SUB4. The fourth electrode layer E4 and the fourth alignment layer AL4 are provided on a side surface of the fourth substrate SUB4 facing the third substrate SUB3. The second liquid-crystal layer LCL2 is sandwiched between the third alignment layer AL3 and the fourth alignment layer AL4.

Please refer to FIG. 9 and FIG. 10 simultaneously. An included angle γ2 between the third alignment direction AD3 of the third alignment layer AL3 and the fourth alignment direction AD4 of the fourth alignment layer AL4 is between 165 degrees and 195 degrees. An included angle γ3 between the second alignment direction AD2 and the third alignment direction AD3 is between 30 degrees and 60 degrees, or between 120 degrees and 150 degrees. In other words, a plurality of liquid-crystal molecules LC2 of the second liquid-crystal layer LCL2 are substantially arranged parallel to each other (as shown in FIG. 9). That is, the second electrically controlled device 220 may be an electrically-controlled-birefringence (ECB) type electrically controlled liquid-crystal cell.

Since the first electrically controlled device 210 and the second electrically controlled device 220 of the present embodiment adopt different liquid-crystal driving modes, the color shift generated by the light from the backlight module 100 after passing through these electrically controlled devices may be effectively suppressed.

In the present embodiment, an included angle α3 between the third alignment direction AD3 of the third alignment layer AL3 and the direction X (or the first viewing angle control axial direction) is, for example, 85 degrees, and an included angle α4 between the fourth alignment direction AD4 of the fourth alignment layer AL4 and the direction X is, for example, −90 degrees. It should be mentioned that, the negative value of the angle here means that the angle is defined based on the direction X and the angle deviated from the direction X in the clockwise direction; on the contrary, if the angle is a positive value, the angle is defined based on the direction X and the angle deviated from the direction X in the counterclockwise direction.

Moreover, an included angle θ between a slow axis SX of the half-wave plate 250 and the direction X is between 50 degrees and 80 degrees or between 140 degrees and 170 degrees. In the present embodiment, the included angle θ is, for example, 65 degrees. That is, the axial direction of the slow axis SX of the half-wave plate 250 of the present embodiment is between the second absorption axis AX2 of the second polarizing layer POL2 and the third alignment direction AD3 of the third alignment layer AL3.

Incidentally, based on the above configuration, the viewing angle range of the display apparatus 30 in the direction X may be optimized by adjusting the applied voltage of the first electrically controlled device 210. For example, the viewing angle range is moved along the direction X as the applied voltage between the first electrode layer E1 and the second electrode layer E2 is increased. Moreover, the viewing angle range of the display apparatus 30 in the direction Y may also be optimized by adjusting the applied voltage of the second electrically controlled device 220. For example: the viewing angle range of the display apparatus 30 in the direction Y is deviated from the normal view direction along the opposite direction of the direction Y as the applied voltage between the third electrode layer E3 and the fourth electrode layer E4 is increased. That is, compared with the display apparatus 10 of FIG. 1, the display apparatus 30 of the present embodiment further has a second angle of view control axial direction parallel or anti-parallel to the direction Y.

Figure 11:
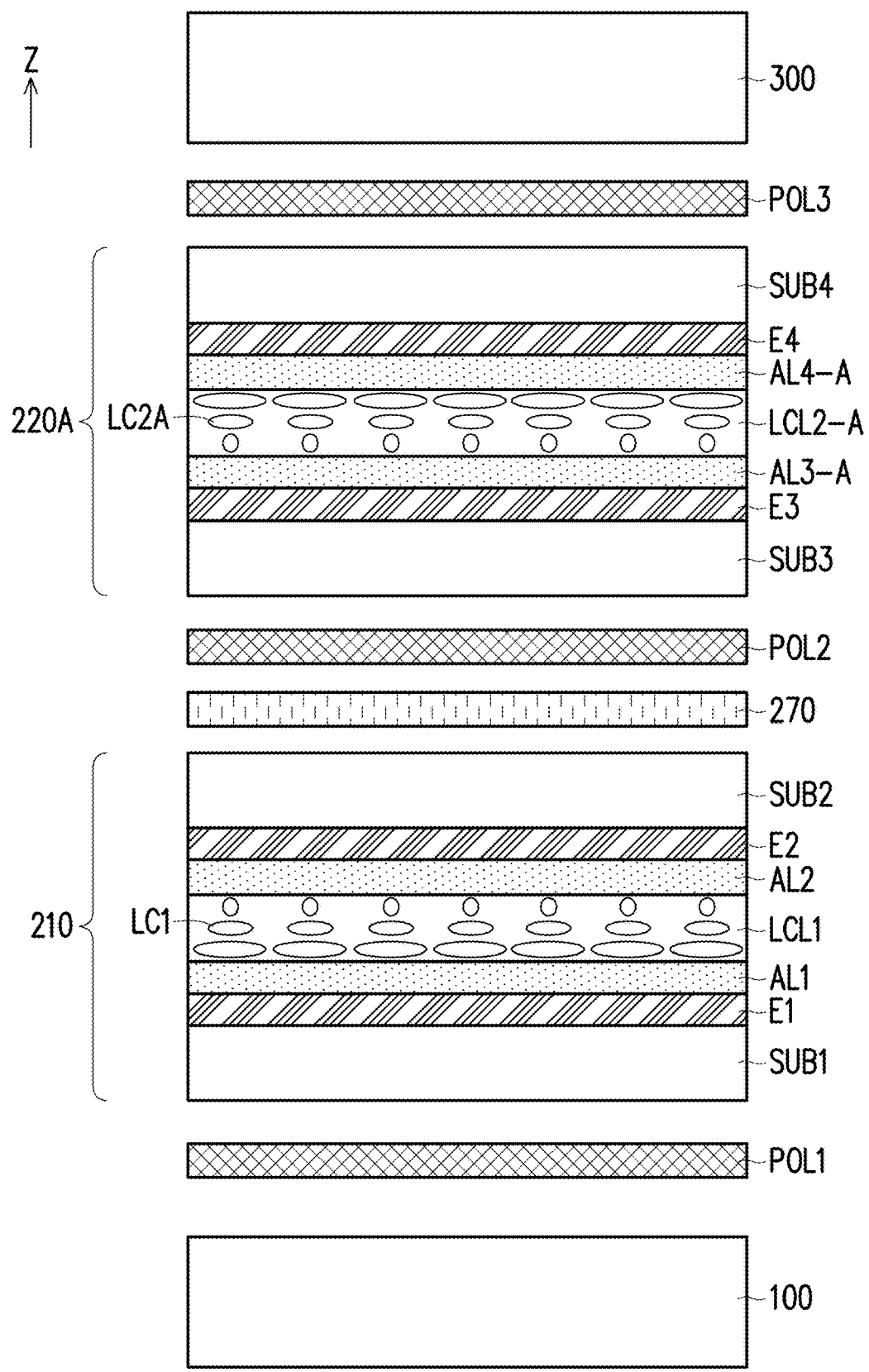
FIG. 11 is a schematic cross-sectional view of a display apparatus according to the fourth embodiment of the disclosure.
Figure 12A:
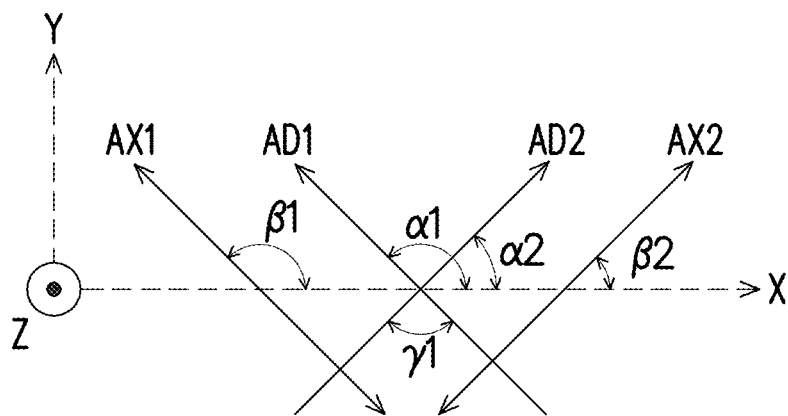
FIG. 12A and FIG. 12B are schematic diagrams of the arrangement relationship between the alignment direction of the alignment layer and the axial direction of the absorption axis of the polarizing layer of FIG. 11.
Figure 12B:
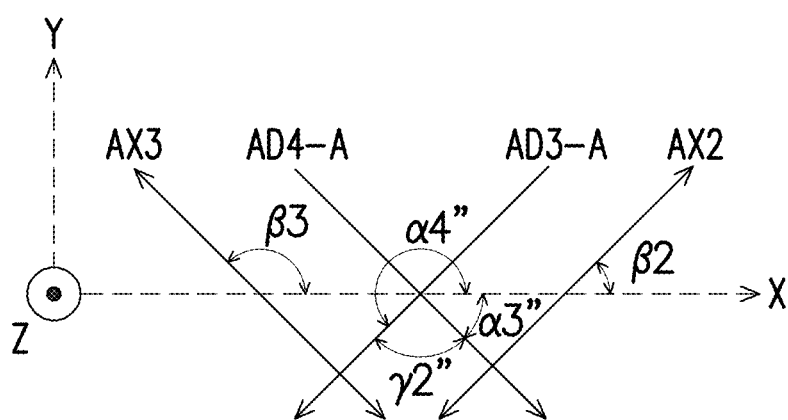

FIG. 11 is a schematic cross-sectional view of a display apparatus according to the fourth embodiment of the disclosure. FIG. 12A and FIG. 12B are schematic diagrams of the arrangement relationship between the alignment direction of the alignment layer and the axial direction of the absorption axis of the polarizing layer of FIG. 11. Please refer to FIG. 11 to FIG. 12B. The main difference between a display apparatus 40 of the present embodiment and the display apparatus 30 of FIG. 9 is that the alignment method of the second liquid-crystal layer of the second electrically controlled device is different.

For example, in the display apparatus 40 of the present embodiment, an included angle γ2″ between a third alignment direction AD3-A of a third alignment layer AL3-A of a second electrically controlled device 220A and a fourth alignment direction AD4-A of a fourth alignment layer AL4-A thereof is between 75 degrees and between 105 degrees. In other words, a plurality of liquid-crystal molecules LC2A of a second liquid-crystal layer LCL2-A are in a twisted arrangement along the direction Z (as shown in FIG. 11), that is, the second electrically controlled device 220A may be a twisted-nematic (TN) type electrically controlled liquid-crystal cell.

In the present embodiment, the third alignment direction AD3-A of the third alignment layer AL3-A is perpendicular to the fourth alignment direction AD4-A of the fourth alignment layer AL4-A, wherein an included angle α3" between the third alignment direction AD3-A and the direction X is, for example, −45 degrees, and an included angle α4" between the fourth alignment direction AD4 and the direction X is, for example, 225 degrees. From another perspective, in the present embodiment, the third alignment direction AD3-A may be anti-parallel to the second alignment direction AD2 (as shown in FIG. 12A and FIG. 12B), but not limited thereto. In another embodiment, the third alignment direction AD3-A may be coaxially parallel to or perpendicular to the second alignment direction AD2.

Furthermore, the display apparatus 40 may also optionally include a third polarizing layer POL3 disposed between the second electrically controlled device 220A and the display panel 300. In the present embodiment, the axial direction of the third absorption axis AX3 of the third polarizing layer POL3 may be optionally parallel to the fourth alignment layer AL4-A. That is, an included angle 83 between the third absorption axis AX3 and the direction X is 135 degrees. However, the disclosure is not limited thereto. In other embodiments, the axial direction of the third absorption axis AX3 of the third polarizing layer POL3 may be perpendicular to the fourth alignment direction AD4-A of the fourth alignment layer AL4-A.

Under the above configuration, the viewing angle range of the display apparatus 40 in the direction X of the present embodiment may be optimized by adjusting the applied voltages of the first electrically controlled device 210 and the second electrically controlled device 220A. For example, the viewing angle range is moved along the direction X as the applied voltage between the first electrode layer E1 and the second electrode layer E2 and the applied voltage between the third electrode layer E3 and the fourth electrode layer E4 are increased.

Since the structural composition and configuration relationship of the first electrically controlled device 210 and the compensation film 270 of the present embodiment are all similar to the first electrically controlled device 210 and the compensation film 270 of FIG. 1, for detailed description, please refer to the relevant paragraphs of the above embodiments. Therefore, the display apparatus 40 of the present embodiment also has the related technical effects produced by the configuration relationship between the phase retardation of the first liquid-crystal layer LCL1 and the out-of-plane phase retardation of the compensation film 270 in the previous embodiment, which are not described again here.

It should be mentioned that, in another modified embodiment, if the display panel 300 is a liquid-crystal display panel and a polarizer of the display panel 300 is provided at a side facing the second electrically controlled device 220A, there is no need to provide the third polarizing layer POL3 of the present embodiment. That is, the electrically controlled panel and the display panel 300 may share the same polarizing layer.

Based on the above, in the electrically controlled panel and the display apparatus of the disclosure, the included angle between the two alignment directions of the two alignment layers of the first electrically controlled device is between 75 degrees and 105 degrees. One of the alignment layers is provided with a polarizing layer at a side facing away from the liquid-crystal layer, and the absorption axis of the polarizing layer is perpendicular or parallel to the first alignment direction of the alignment layer. Accordingly, the electrically controlled panel may have light filtering capabilities within a single-sided viewing angle range in a specific direction. By disposing a compensation film at the side of the polarizing layer provided with the liquid-crystal layer and controlling the phase retardation of the liquid-crystal layer between 400 nm and 600 nm or between 800 nm and 1200 nm, the overall light filtering effect of the electrically controlled panel within the single-sided viewing angle range and the privacy effect of the display apparatus within the single-sided viewing angle range may be effectively improved.

The foregoing description of the preferred embodiments of the disclosure has been presented for purposes of illustration and description. It is not intended to be exhaustive or to limit the disclosure to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the disclosure and its best mode practical application, thereby to enable persons skilled in the art to understand the disclosure for various embodiments and with various modifications as are suited to the particular use or implementation contemplated. It is intended that the scope of the disclosure be defined by the claims appended hereto and their equivalents in which all terms are meant in their broadest reasonable sense unless otherwise indicated. Therefore, the term "the disclosure", "the present disclosure" or the like does not necessarily limit the claim scope to a specific embodiment, and the reference to particularly preferred exemplary embodiments of the disclosure does not imply a limitation on the disclosure, and no such limitation is to be inferred. The disclosure is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the disclosure. It should be appreciated that variations may be made in the embodiments described by persons skilled in the art without departing from the scope of the present disclosure as defined by the following claims. Moreover, no element and component in the present disclosure is intended to be dedicated to the public regardless of whether the element or component is explicitly recited in the following claims.

What is claimed is:

1. A display apparatus, comprising:
   a backlight module;
   a display panel disposed on the backlight module;
   a first electrically controlled device disposed between the backlight module and the display panel, and comprising:
   a first alignment layer having a first alignment direction;
   a second alignment layer having a second alignment direction; and
   a first liquid-crystal layer disposed between the first alignment layer and the second alignment layer, wherein an included angle between the first alignment direction of the first alignment layer and the second alignment direction of the second alignment layer is between 75 degrees and 105 degrees, and a phase retardation of the first liquid-crystal layer is between 400 nm and 600 nm or between 800 nm and 1200 nm;

a first polarizing layer disposed between the backlight module and the first electrically controlled device, and having a first absorption axis parallel or perpendicular to the first alignment direction; and a first compensation film disposed between the first polarizing layer and the display panel.

2. The display apparatus of claim 1, further comprising:
a second polarizing layer disposed between the display panel and the first electrically controlled device, and having a second absorption axis parallel or perpendicular to the second alignment direction, wherein an axial direction of the second absorption axis of the second polarizing layer of the display apparatus is perpendicular to an axial direction of the first absorption axis of the first polarizing layer.

3. The display apparatus of claim 1, wherein a phase retardation of the first liquid-crystal layer is between 400 nm and 600 nm, and an out-of-plane phase retardation of the first compensation film is between −50 nm and −200 nm.

4. The display apparatus of claim 1, wherein a phase retardation of the first liquid-crystal layer is between 800 nm and 1200 nm, and an out-of-plane phase retardation of the first compensation film is between −100 nm and −400 nm.

5. The display apparatus of claim 1, further comprising:
a second compensation film disposed between the display panel and the first electrically controlled device, wherein the first compensation film is disposed between the first polarizing layer and the first electrically controlled device, and a sum of an out-of-plane phase retardation of the first compensation film and an out-of-plane phase retardation of the second compensation film is between −100 nm and −400 nm or between −50 nm and −200 nm.

6. The display apparatus of claim 5, wherein the out-of-plane phase retardation of the first compensation film is equal to the out-of-plane phase retardation of the second compensation film.

7. The display apparatus of claim 1, wherein the first compensation film is a biaxial compensation film, the biaxial compensation film has an in-plane phase retardation along an optical axis, and the optical axis is parallel or perpendicular to the first absorption axis of the first polarizing layer.

8. The display apparatus of claim 1, further comprising:
a second polarizing layer disposed between the display panel and the first electrically controlled device, and having a second absorption axis parallel or perpendicular to the second alignment direction;
a second electrically controlled device disposed between the first electrically controlled device and the display panel, and comprising:
a third alignment layer having a third alignment direction;
a fourth alignment layer having a fourth alignment direction; and
a second liquid-crystal layer disposed between the third alignment layer and the fourth alignment layer, wherein an included angle between the third alignment direction of the third alignment layer and the fourth alignment direction of the fourth alignment layer is between 165 degrees and 195 degrees, and an included angle between the second alignment direction and the third alignment direction is between 30 degrees and 60 degrees, or between 120 degrees and 150 degrees; and
a half-wave plate disposed between the second polarizing layer and the second electrically controlled device.

9. The display apparatus of claim 1, further comprising:
a second electrically controlled device disposed between the first electrically controlled device and the display panel, and comprising:
a third alignment layer having a third alignment direction;
a fourth alignment layer having a fourth alignment direction; and
a second liquid-crystal layer disposed between the third alignment layer and the fourth alignment layer, wherein an included angle between the third alignment direction of the third alignment layer and the fourth alignment direction of the fourth alignment layer is between 75 degrees and 105 degrees, and the second alignment direction of the second alignment layer is parallel or perpendicular to the third alignment direction of the third alignment layer.

10. The display apparatus of claim 1, wherein the first compensation film is a C-plate compensation film.

11. An electrically controlled panel, comprising:
a first electrically controlled device, comprising:
a first alignment layer having a first alignment direction;
a second alignment layer having a second alignment direction; and
a first liquid-crystal layer disposed between the first alignment layer and the second alignment layer, wherein an included angle between the first alignment direction of the first alignment layer and the second alignment direction of the second alignment layer is between 75 degrees and 105 degrees, and a phase retardation of the first liquid-crystal layer is between 400 nm and 600 nm or between 800 nm and 1200 nm;
a first polarizing layer disposed at a side of the first alignment layer away from the first liquid-crystal layer, and having a first absorption axis parallel to or perpendicular to the first alignment direction; and
a first compensation film disposed at a side of the first polarizing layer provided with the first electrically controlled device.

* * * * *